United States Patent
Sota

(10) Patent No.: US 6,615,292 B1
(45) Date of Patent: Sep. 2, 2003

(54) DATA TRANSFER APPARATUS PERFORMING DMA DATA TRANSFER FROM NON-CONSECUTIVE ADDRESSES

(75) Inventor: Yasuhiro Sota, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/532,457

(22) Filed: Mar. 23, 2000

(30) Foreign Application Priority Data

Mar. 26, 1999 (JP) .......................................... 11-083257

(51) Int. Cl.[7] .......................... G06F 13/28; G06F 13/00
(52) U.S. Cl. .............................. 710/22; 710/23; 710/24; 710/26; 710/5; 710/33
(58) Field of Search .......................... 710/22–28, 3–6, 710/33, 15–19; 711/201–203

(56) References Cited

U.S. PATENT DOCUMENTS

| | | | | |
|---|---|---|---|---|
| 4,797,812 A | * | 1/1989 | Kihara ........................ | 710/26 |
| 4,847,750 A | * | 7/1989 | Daniel ........................ | 710/22 |
| 5,251,303 A | * | 10/1993 | Fogg et al. ................. | 710/24 |
| 5,586,253 A | * | 12/1996 | Green et al. ................ | 711/201 |
| 5,687,392 A | * | 11/1997 | Radko ........................ | 710/22 |
| 5,708,849 A | * | 1/1998 | Coke et al. ................. | 710/22 |
| 6,219,725 B1 | * | 4/2001 | Diehl et al. ................ | 710/26 |

FOREIGN PATENT DOCUMENTS

| | | |
|---|---|---|
| JP | H02-39344 | 2/1991 |
| JP | H04-264652 | 9/1992 |
| JP | H05-334233 | 12/1993 |
| JP | H06-19836 | 1/1994 |
| JP | H10-91571 | 4/1998 |

\* cited by examiner

*Primary Examiner*—Jeffrey Gaffin
*Assistant Examiner*—Joshua D Schneider
(74) *Attorney, Agent, or Firm*—Sughrue Mion, PLLC

(57) ABSTRACT

A DMA transfer device according to the present invention allows data to be transferred from non-consecutive addresses. A logical address controller checks if logical addresses of data transferred from an input/output bus are consecutive. If they are not consecutive, the logical address controller sends an address non-consecutive interrupt to an input/output controller. The input/output controller sets a physical address, corresponding to the logical address received from the input/output bus, into a physical address controller. The physical address controller checks if a page change has occurred in the physical address and, if it detects the page change, sends a page change interrupt to the input/output controller.

12 Claims, 7 Drawing Sheets

DATA TRANSFER APPARATUS PERFORMING DMA DATA TRANSFER FROM NON-CONSECUTIVE ADDRESSES

BACKGROUND OF THE INVENTION

The present invention relates to a data transfer apparatus which transfers data between a peripheral device and the main storage unit, and more particularly to a data transfer apparatus which performs a direct access memory transfer.

Conventionally, when data is transferred in the direct memory access (hereinafter called DMA) transfer mode in which data is transferred from a peripheral device to the main storage unit without processor intervention, data is transferred from consecutive addresses in the address space of the peripheral device to consecutive addresses in the main storage unit. During this DMA transfer, data is read sequentially from the address space of the peripheral device, beginning with the start address, and is written sequentially into the address space of the main storage unit, beginning with the start address.

In contrast to the DMA transfer described above, data is sometimes transferred from the consecutive address space on a peripheral device to non-consecutive addresses in the main storage unit. For example, when image data generated by a character generator is transferred to non-consecutive addresses in the DMA transfer mode, the DMA controller adds the length of a gap in the destination address space to the value in the transfer destination register before starting the transfer. This allows the transfer destination address to be automatically updated even when there is a gap in the destination address space.

The conventional apparatus described above allows non-consecutive addresses to be used in the transfer destination, but not in the transfer source. The DMA transfer is executed within this limitation. However, when data is transferred from a peripheral device to the main storage unit, it is not always fastest to read data sequentially beginning with the start. This is because the peripheral device sometimes involves a delay factor such as a seek time. Instead, non-sequential reading, if accepted to some degree, enables data to be read faster as a whole in many cases.

On the other hand, the DMA data transfer, which is performed on the assumption that the transfer addresses are consecutive, does not ensure high speed system processing if each data transfer involves processor intervention.

SUMMARY OF THE INVENTION

It is an object of the present invention to provide a data transfer apparatus which accepts non-consecutive source data addresses to speed up data transfer while maintaining the DMA transfer framework.

In one preferred embodiment, the data transfer apparatus according to the present invention, provided for use in a direct memory access transfer in which data is transferred by calculating the physical address corresponding to the logical addresses of data to be transferred, resets the physical address upon detection that the logical addresses are not consecutive.

BRIEF DESCRIPTION OF THE DRAWINGS

Other features and advantages of the invention will be made more apparent by the detailed description hereunder, taken in conjunction with the accompanying drawings, wherein.

DESCRIPTION OF THE PREFERRED EMBODIMENTS

An embodiment according to the present invention will be described in detail with reference to the attached drawings.

Figure 1:
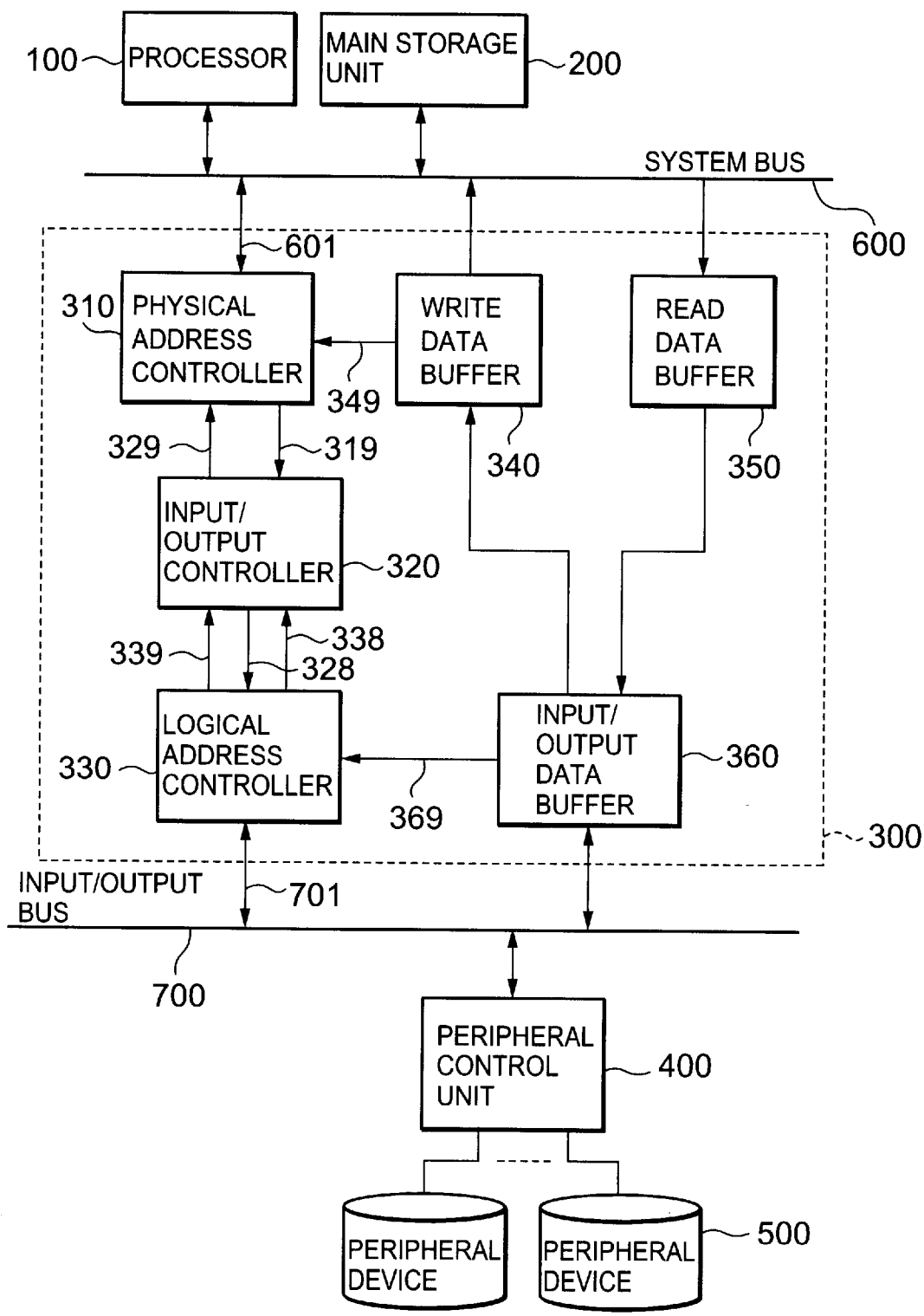
FIG. 1 is a diagram showing the overall configuration of a system to which the present invention is applied.

Referring to FIG. 1, a data processing system to which the present invention is applied comprises a data transfer apparatus 300 that connects a system bus 600 and an input/output bus 700. To the system bus 600, a processor 100 from which a data transfer request is issued and a main storage unit 200 in which transfer data is stored are connected. To the input/output bus 700, a peripheral control unit 400 is connected. At least one peripheral device 500 is connected to the peripheral control unit 400. The peripheral control unit 400 controls the peripheral devices 500 to write and read data to or from them.

The data transfer apparatus 300 comprises a write data buffer 340 in which data to be written to the main storage unit 200 on the system bus 600 is stored, a read data buffer 350 in which data read from the main storage unit 200 on the system bus 600 is stored, and an input/output data buffer 360 in which data read from the input/output bus 700 and data to be written to the input/output bus 700 are stored. The data transfer apparatus 300 further comprises a logical address controller 330 that checks if logical addresses received from the input/output bus 700 are consecutive, a physical address controller 310 that checks a physical address to be sent to the system bus 600 if it will cause a page change, and an input/output controller 320 that performs predetermined processing in response to an interrupt from the logical address controller 330 and the physical address controller 310.

Figure 2:
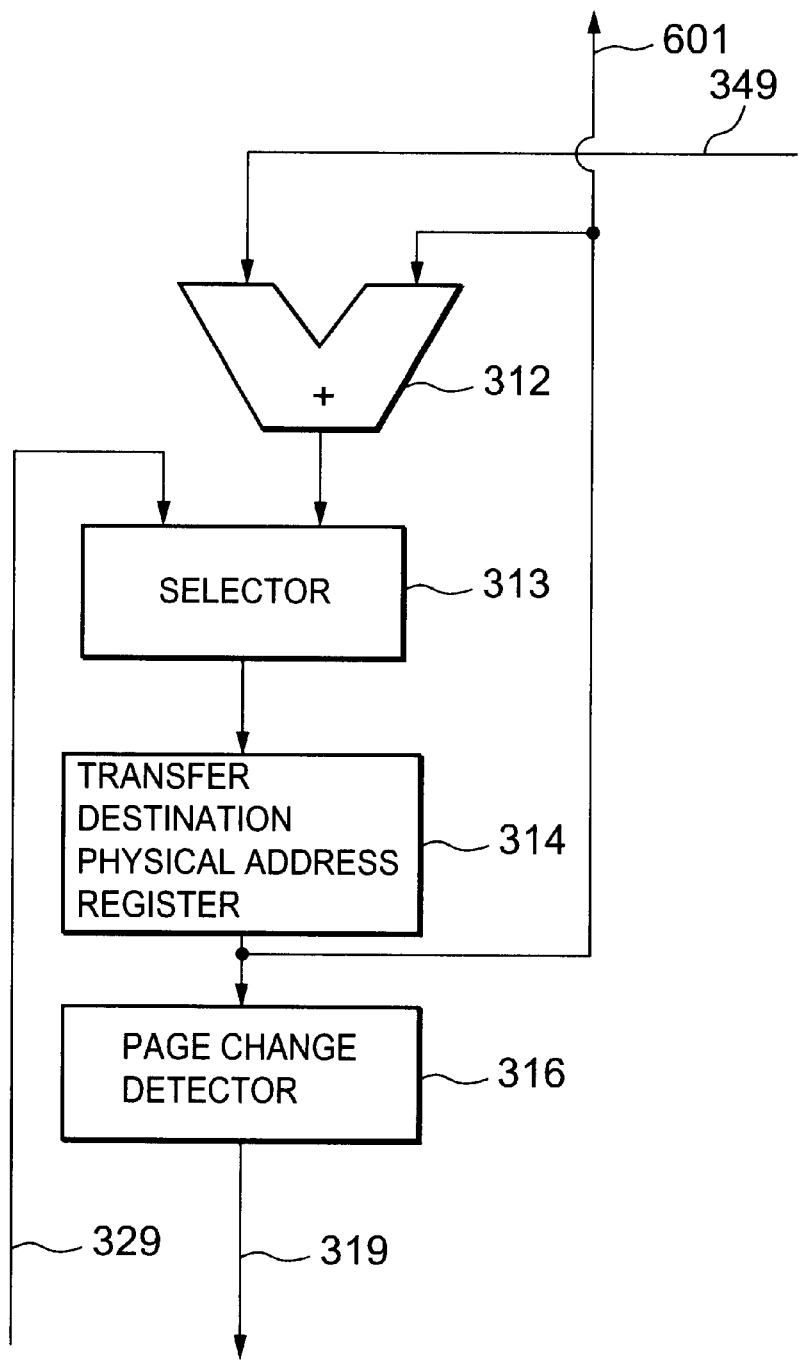
FIG. 2 is a block diagram showing the configuration of a physical address controller used in an embodiment of a data transfer apparatus according to the present invention.

Referring to FIGS. 1 and 2, the physical address controller 310 comprises a transfer destination physical address register 314 in which a transfer destination physical address in the main storage unit 200 on the system bus 600 is stored, a page change detector 316 that checks if a page change has occurred in the transfer destination physical address register 314, an adder 312 that updates the transfer destination physical address register 314, and a selector 313 that selects an address value to be set in the transfer destination physical address register 314.

Initially, the transfer destination physical address register 314 contains the physical address given from the input/output controller 320 via a signal line 329. After that, each time data is transferred from the write data buffer 340 to the system bus 600, the adder 312 adds the transfer data length to the transfer destination physical address register 314. At the initialization time, the selector 313 selects the value from the input/output controller 320; at a transfer time, it selects the value from the adder 312. The address value is sent from the transfer destination physical address register 314 to the system bus system bus 600 via a signal line 601.

The adder 312 receives the transfer data length from the write data buffer 340 via a signal line 349. The transfer data length is received from the write data buffer 340 at the same time data is output from the write data buffer 340 to the system bus 600.

The page change detector 316 checks if a carry has occurred in a predetermined position in the transfer destination physical address register 314. For example, for a page that is 4 KB in length, the page change detector 316 finds that a page change has occurred when a carry from the 12th bit into the 13th bit occurs in the low-order address. Upon detecting the page change, the page change detector 316 sends a page change interrupt to the input/output controller 320 via a signal line 319. In response to the page change interrupt, the input/output controller 320 sets the starting physical address of the next page in the transfer destination physical address register 314 and restarts the DMA transfer.

Figure 3:
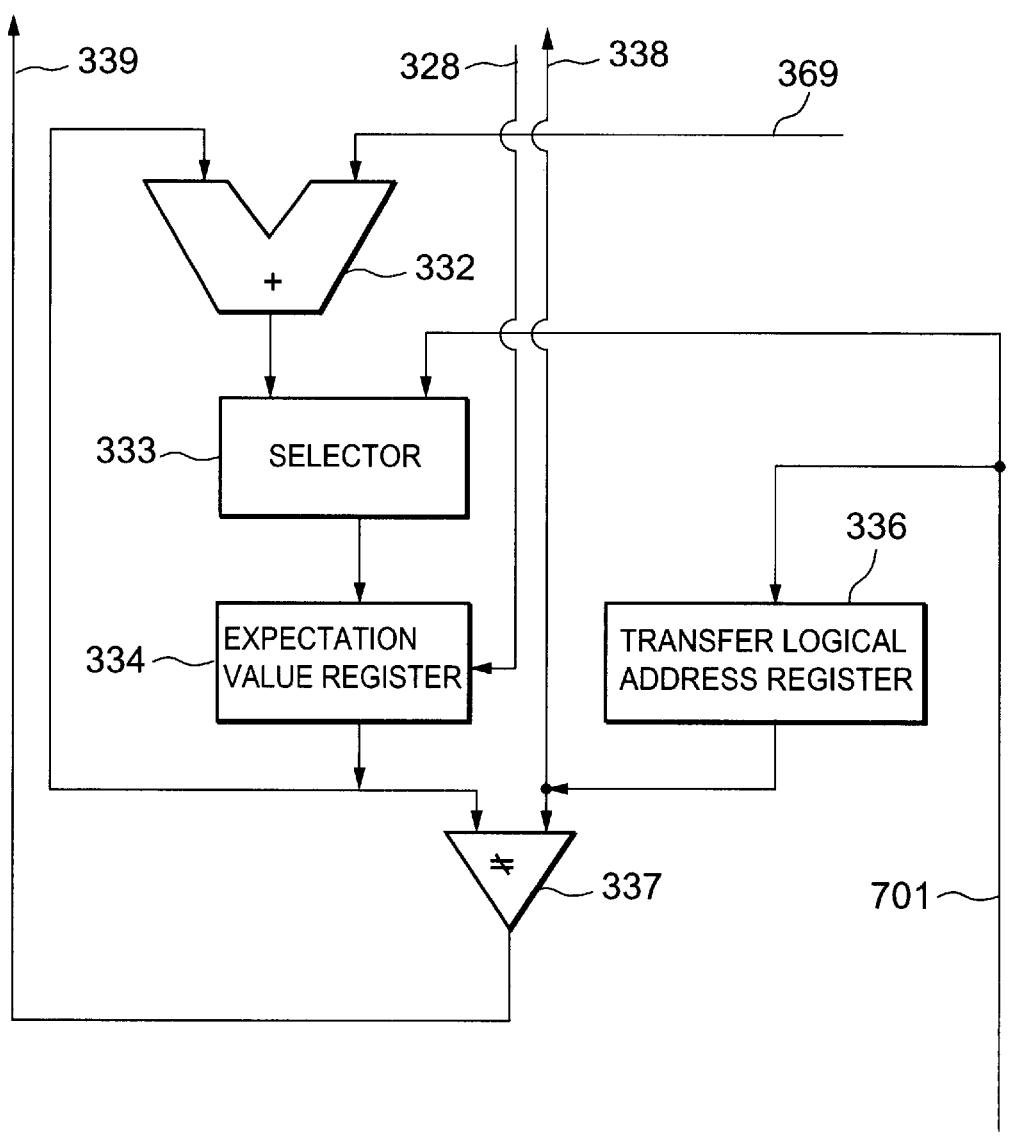
FIG. 3 is a block diagram showing the configuration of a logical address controller used in the embodiment of the data transfer apparatus according to the present invention.

Referring to FIGS. 1 and 3, the logical address controller 330 comprises a transfer logical address register 336 in which the logical address of data transferred from the input/output bus 700 is stored, an expectation value register 334 in which the logical address of the next data is stored when data resides in consecutive addresses, a comparator 337 which compares the value in the transfer logical address register 336 and the value in the expectation value register 334, an adder 332 which updates the value in the expectation value register 334, and a selector 333 which selects a value to be set in the expectation value register 334.

The transfer logical address register 336 contains a logical address sent from the input/output bus 700 via a signal line 701. The transfer logical address value is sent from the transfer logical address register 336 to the input/output controller 320 via a signal line 338.

When the DMA transfer is started, the expectation value register 334 is cleared to zero by the clear signal sent from the input/output controller 320 via a signal line 328. When the comparator 337 finds a mismatch, the logical address received from the input/output bus 700 is sent to the expectation value register 334 via the signal line 701. After that, the adder 332 adds the length of data, transferred from the input/output bus 700 to the input/output data buffer 360, to the value stored in the expectation value register 334. When the comparator 337 finds an address mismatch as described above, the selector 333 selects the value sent from the input/output bus 700; when data is transferred from consecutive addresses, the selector 333 selects the value sent from the adder 332.

The adder 332 receives the transfer data length from the write data buffer 340 via a signal line 369. The transfer data length is sent from the write data buffer 360 at the same time data is output from the input/output bus 700 to the input/output data buffer 360.

The comparator 337 compares the value stored in the expectation value register 334 and the value stored in the transfer logical address register 336. When the comparator 337 finds a mismatch, it notifies the input/output controller 320 of the mismatch via an address non-consecutive interrupt signal line 339.

In response to the address non-consecutive interrupt, the input/output controller 320 stores the logical address, received from the input/output bus 700, into the expectation value register 334. At the same time, the input/output controller 320 stores the physical address, corresponding to the logical address from the input/output bus 700, into the transfer destination physical address register (314 in FIG. 2) in the physical address controller 310 and restarts the DMA transfer.

Next, the operation of the data transfer apparatus used in the embodiment of the present invention will be described in detail with reference to the drawings.

Figure 4:
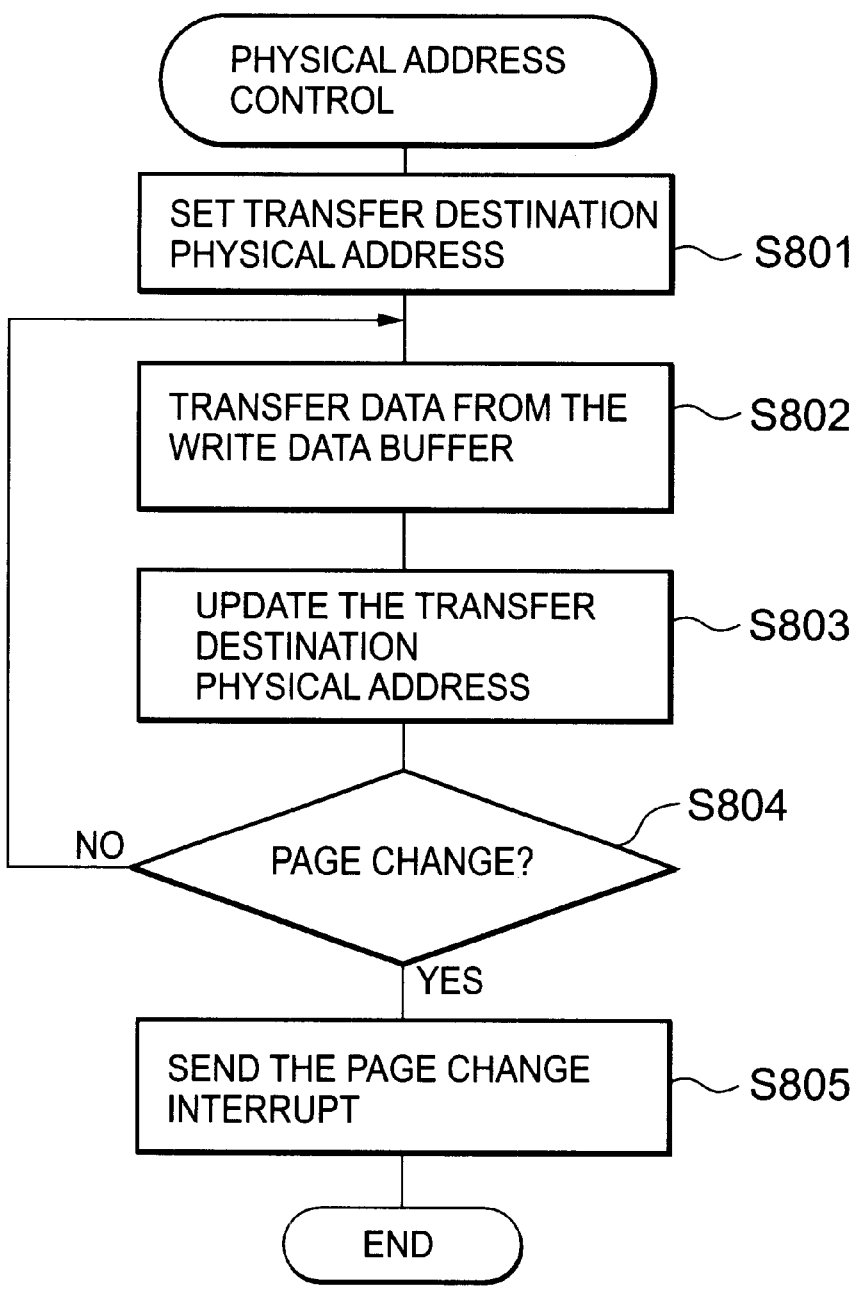
FIG. 4 is a diagram showing the operation of physical address control in the embodiment of the present invention.
Figure 5:
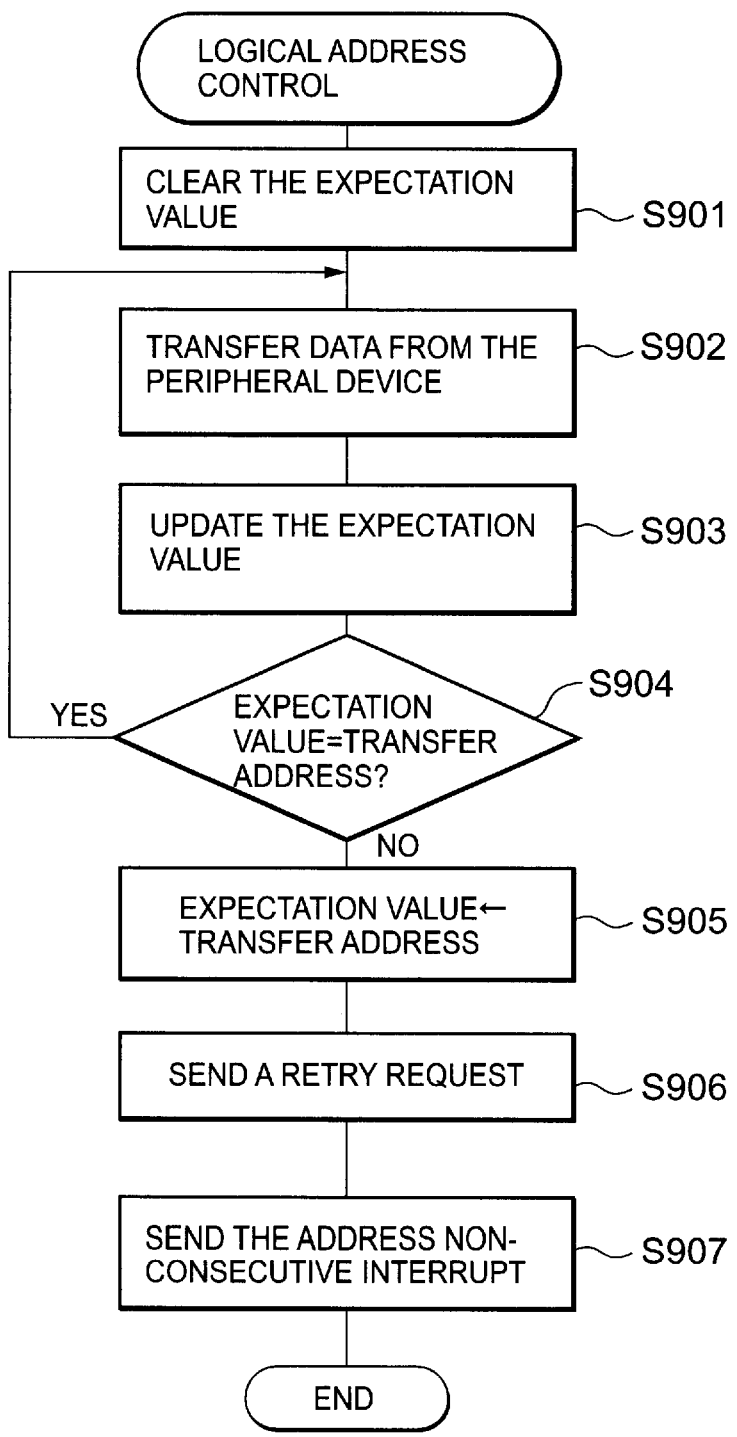
FIG. 5 is a diagram showing the operation of logical address control in the embodiment of the present invention.

FIG. 4 shows the physical address control operation, and FIG. 5 shows the logical address control operation. They overlap each other in time.

Referring to FIGS. 1 to 5, in response to a DMA transfer request from the processor 100, the input/output controller 320 stores the physical address to be used in the DMA transfer into the transfer destination physical address register 314 in the physical address controller 310 (step S801) At the same time, the input/output controller 320 clears the expectation value register 334 to zero (step S901). After that, the input/output controller 320 passes the logical start address of the transfer destination, transfer data length, transfer direction, and so on, to the peripheral control unit 400 and requests it to start the DMA transfer.

When data is sent from the peripheral device 500 to the input/output data buffer 360 (step S902), information on the transfer data length is sent to the logical address controller 330 via the signal line 369. The adder 332 adds the transfer data length, sent via the signal line 369, to the value in the expectation value register 334 (step S903). The comparator 337 compares the value in the expectation value register 334 and the value stored in the transfer logical address register 336 (step S904). If they match, a request is sent to the physical address controller 310 to transfer the data and the next data transfer is continued. If they mismatch, the transfer logical address is stored in the expectation value register 334 (step S905). A request is then sent to the peripheral device 500 to retry the transfer (step S906). After that, an address non-consecutive interrupt is sent to the input/output controller 320 (step S907).

In response to the address non-consecutive interrupt, the input/output controller 320 stores the physical address, corresponding to the logical address sent from the input/output bus 700, into the transfer destination physical address register 314 in the physical address controller 310 and restarts the DMA transfer.

This logical address control automatically switches the addresses within the data transfer apparatus 300, thus making it possible to transfer data quickly even if data is transferred in any sequence in a part of a consecutive address range during DMA transfer.

The data stored in the input/output data buffer 360 is then transferred to the write data buffer 340. When the transfer data is output from the write data buffer 340 to the system bus 600 (step S802), the information on the transfer data length is sent to the physical address controller 310 via the signal line 349. The adder 312 adds the transfer data length, received via the signal line 349, to the value stored in the transfer destination physical address register 314(step S803).

If the page change detector 316 does not detect a page change (step S804), the data transfer is continued. If the page change detector 316 detects a page change, the data transfer is suspended and the page change interrupt is sent to the input/output controller 320 (step S805).

In response to the page change interrupt, the input/output controller 320 stores the physical address of the next page into the transfer destination physical address register 314 and restarts the DMA transfer.

This physical address control automatically switches the addresses within the data transfer apparatus 300 each time the end of a page is detected, thus making it possible to transfer data larger than the page size in the DMA mode.

Next, a data transfer apparatus used in another embodiment according to the present invention will be described.

Figure 6:
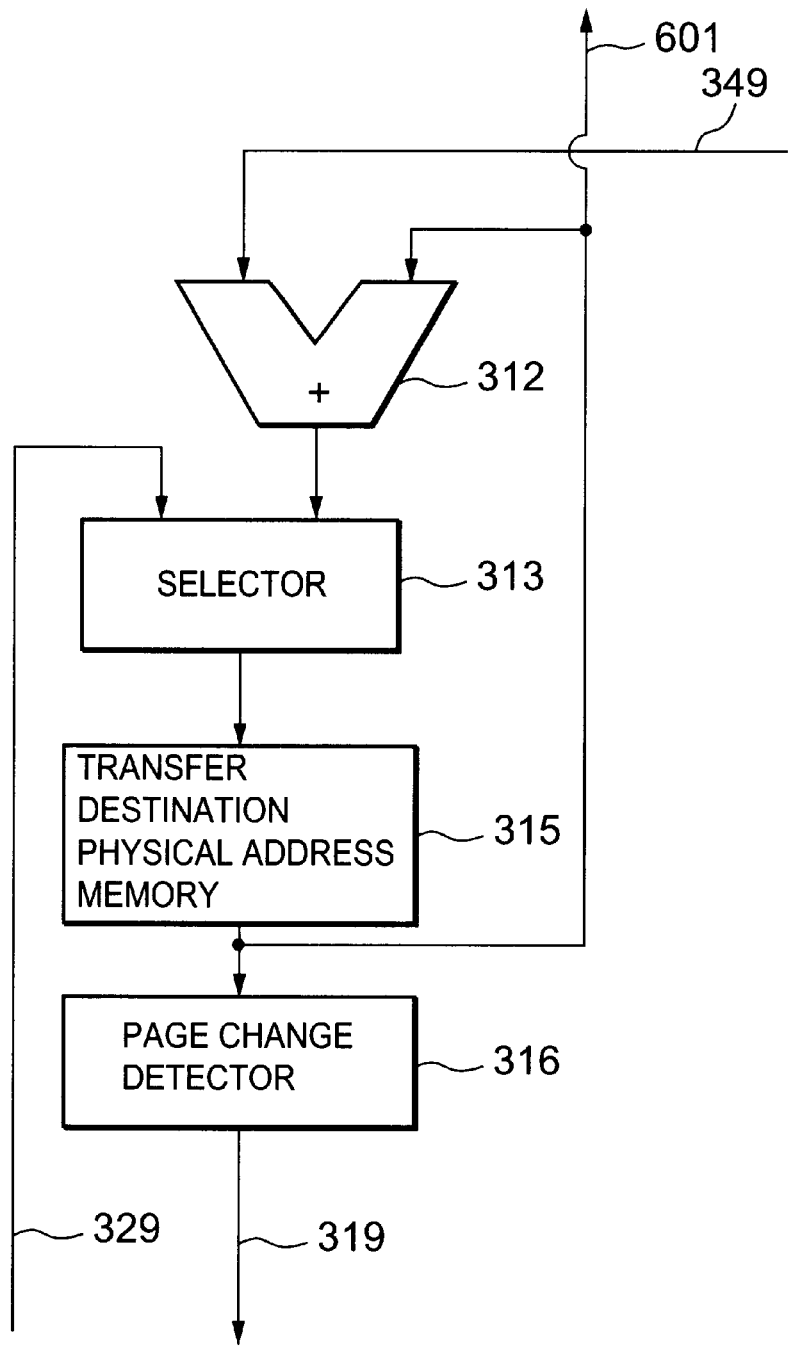
FIG. 6 is a block diagram showing the configuration of a physical address controller used in another embodiment of the data transfer apparatus according to the present invention.

Referring to FIG. 6, a physical address controller 310 in another embodiment has the same configuration as that of the physical address controller 310 shown in FIG. 2 except that a transfer destination physical address memory 315 is used instead of the transfer destination physical address register 314 in FIG. 2. The transfer destination physical address memory 315 has a plurality of entries each corresponding to one of the plurality of peripheral devices 500 controlled by the peripheral control unit 400 connected to the input/output bus 700 shown in FIG. 1. Each entry of the transfer destination physical address memory 315 contains the next physical address from which data is to be transferred when the next address on the peripheral device 500 is consecutive to the current address.

Figure 7:
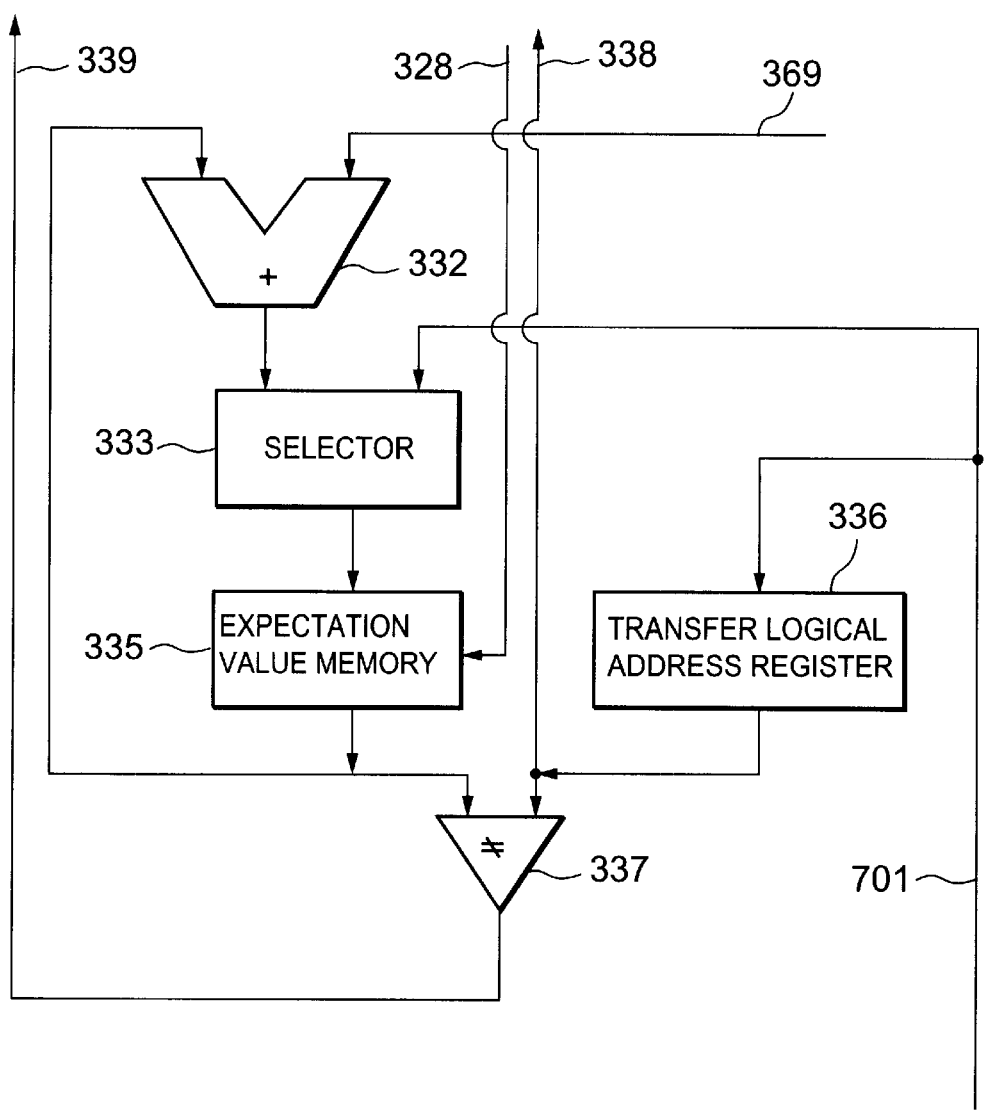
FIG. 7 is a block diagram showing the configuration of a logical address controller used in another embodiment of the data transfer apparatus according to the present invention.

Referring to FIG. 7, a logical address controller 330 used in another embodiment has the same configuration as that of the logical address controller 330 shown in FIG. 3 except that an expectation value memory 335 is used instead of the expectation value register in FIG. 3. The expectation value memory 335 has a plurality of entries each corresponding to one of the plurality of peripheral devices 500 controlled by the peripheral control unit 400 connected to the input/output bus 700 shown in FIG. 1. Each entry of the expectation value memory 335 contains the next logical address from which data is to be transferred when the next address on the peripheral device 500 is consecutive to the current address.

The overall configuration of a data processing system to which another embodiment of the present invention is applied is the same as that of the system shown in FIG. 1. The internal configurations of the components, except those of the physical address controller and the logical address controller, are the same as those of the components shown in FIGS. 2 and 3.

In this embodiment, transfer data from the input/output bus 700 has the identifier of the peripheral device from which the transfer data is output. This identifier is used in indexing the expectation value memory 335. The comparator 337 compares the value in the corresponding entry of the expectation value memory 335 and the value in the transfer logical address register 336. When the comparator 337 detects a mismatch, the address non-consecutive interrupt is sent to the input/output controller 320 via a signal line 339. In response to the address non-consecutive interrupt, the input/output controller 320 stores the physical address, corresponding to the logical address from the input/output bus 700, into the entry in the transfer destination physical address memory 315, indicated by the identifier, in the physical address controller 310, and then restarts the DMA transfer.

That is, the transfer destination physical address memory 315 and the expectation value memory 335 act as the transfer destination physical address register 314 and the expectation value register 334 in the first embodiment, respectively. In the first embodiment, however, the transfer destination physical address register 314 and the expectation value register 334 must be reset each time the peripheral device outputting transfer data is changed to another peripheral device. In another embodiment described above, they need not be reset even if the peripheral device 500 is changed to another peripheral device as long as addresses are consecutive.

As described above, the data transfer apparatus according to the present invention detects non-consecutive addresses in a peripheral device to eliminate an address sequence constraint. This allows any operable peripheral device to transfer data any time it is ready, thus ensuring a high-speed DMA transfer as a whole.

What is claimed is:

1. A data transfer apparatus, comprising:
  a logical address controller for checking if logical addresses of transfer data transferred during a direct memory access transfer are consecutive;
  a physical address controller for calculating a physical address in response to an update of said logical address; and
  an input/output controller for resetting said physical address in said physical address controller when said logical address controller detects that said logical addresses are non-consecutive.

2. The data transfer apparatus according to claim 1, wherein said logical address controller comprises:
  an expectation value register for storing a next logical address when the logical addresses of said transfer data are assumed to be consecutive;
  a logical address counter for updating said expectation value register according to a length of said transfer data; and
  a comparator for comparing the logical address of said transfer data and the logical address stored in said expectation value register and, if they mismatch, outputting information indicating that the logical addresses are non-consecutive.

3. The data transfer apparatus according to claim 2, wherein said comparator generates an address non-consecutive interrupt if the logical address of said transfer data mismatches the logical address stored in said expectation value register.

4. The data transfer apparatus according to claim 1, wherein said physical address controller checks if a page change has occurred in said physical address and wherein said input/output controller resets said physical address in said physical address controller when said physical address controller detects the page change.

5. The data transfer apparatus according to claim 4, wherein said physical address controller comprises:
  a physical address register for storing a next physical address when said physical addresses are assumed to be consecutive;
  a physical address counter for updating said physical address register according to a length of said transfer data; and
  a page change detector for outputting information on the page change if the page change is detected in the physical address stored in said physical address register.

6. The data transfer apparatus according to claim 5, wherein said page change detector generates a page change interrupt upon detecting the page change in the physical address stored in said physical address register.

7. The data transfer apparatus according to claim 2, said data transfer apparatus performing the direct memory access transfer from a plurality of transfer source devices, wherein said logical address controller comprises:

an expectation value memory for storing a next logical address for each of said plurality of transfer source devices when the logical addresses of said transfer data are assumed to be consecutive;

the logical address counter for updating said expectation value memory for a corresponding transfer source device according to a length of said transfer data; and the comparator for comparing the logical address of said transfer data and the logical address stored in said expectation value memory for the corresponding transfer source device and, if they mismatch, outputting information indicating that the logical addresses are non-consecutive.

8. The data transfer apparatus according to claim 4, said data transfer apparatus performing the direct memory access transfer from a plurality of transfer source devices, wherein said physical address controller comprises:

a physical address memory for storing a next physical address for each of said plurality of transfer source devices when said physical addresses are assumed to be consecutive;

a physical address counter for updating said physical memory for a corresponding transfer source device according to a length of said transfer data; and a page change detector for outputting information on the page change if the page change is detected in the physical address stored in said physical address memory.

9. A data processing system having an input/output bus to which a plurality of peripheral devices are connected, a system bus to which a main storage unit is connected, and a direct access device performing direct memory access transfer between said input/output bus and said system bus, wherein said data transfer apparatus comprises:

a logical address controller for checking if logical addresses of transfer data received from said input/output bus are consecutive;

a physical address controller for calculating a physical address in response to an update of said logical address; and an input/output controller for resetting said physical address in said physical address controller when said logical address controller detects that said logical addresses are non-consecutive.

10. The data processing system according to claim 9, wherein said physical address controller checks if a page change has occurred in said physical address and wherein said input/output controller resets said physical address in said physical address controller when said physical address controller detects the page change.

11. A data transfer method for use in a direct memory access transfer between an input/output bus to which a plurality of peripheral devices are connected and a system bus to which a main storage unit is connected, said method comprising the steps of:

updating a logical address of transfer data each time it is transferred;

calculating a physical address in response to an update of said logical address;

checking if said logical addresses are consecutive; and if said logical addresses are non-consecutive, resetting said physical address.

12. The data transfer method according to claim 11, further comprising the steps of:

checking if a page change has occurred in said physical address; and if said page change has occurred in said physical address, resetting said physical address.

* * * * *